Patented Sept. 30, 1941

2,257,278

UNITED STATES PATENT OFFICE 2,257,278

PROCESS FOR COLORED TITANIUM PIGMENTS

Holger H. Schaumann, Roselle, Del., assignor to E. I. du Pont de Nemours & Company, Wilmington, Del., a corporation of Delaware No Drawing. Application August 23, 1939, Serial No. 291,497

17 Claims. (Cl. 106—300)

This invention relates to a process for the production of improved pigments. More particularly it relates to a process for the manufacture of colored titanium pigments characterized by their improved durability in exterior paints and resistance to chemical fading. Still more particularly it relates to the production of yellow and buff titanium oxide pigments.

Various processes have been disclosed in the past for the production of colored titanium oxide pigments of various colors including buff pigments. Thus, a chromium compound has been added to titanium oxide prior to calcination and the titanium and chromium oxide would react during calcination thereby giving a colored titanium material. The color can be regulated within certain limits and may be varied from light to dark buff depending on the amount of chromium used. However, there is a tendency in this process to develop a slight greenish tint which for some uses has been found undesirable and various efforts have been made to overcome this objectionable tone.

Further, the calcination of titanium oxide in the presence of chromium compounds by this prior art process is usually carried out in the presence of alkali metal compounds such as potassium sulfate. During calcination, a portion of this alkali metal compound is converted to a chromate thereby leaving soluble chromates in the calcined pigment. This makes it necessary to carefully wash the pigment, usually carried out during or subsequent to the wet-grinding operation, in order to avoid poor durability in exterior paints because of the presence of this soluble chromate salt.

This invention has as an object the production of improved titanium pigments. A further object is the production of a yellow or buff titanium oxide pigment showing none of the disadvantage characteristics of the above mentioned prior art pigment. A further object is the production of titanium oxide pigments which do not require the use of coloring oxides which are rendered soluble during the calcination operation in their manufacture. A still further object is the use of nickel and/or cobalt compounds for the production of tinted titanium oxide pigments using antimony compounds as agents for developing the yellow or buff color effectively. Additional objects will become apparent from an examination of the following description and claims.

These objects are obtained according to the herein described process which broadly comprises calcining a mixture comprising titanium oxide, a compound of antimony, and at least one member selected from the group consisting of compounds of nickel and cobalt.

In a more restricted embodiment this invention comprises adding a compound of antimony to a titanium hydrolyzed product such as that obtained by the hydrolysis of titanium solutions by processes well-known in the art and subsequently adding thereto at least one member selected from the group consisting of compounds of nickel and cobalt, preferably soluble salts of said compounds. The mixture is thereafter calcined at a temperature between about 800° C. and about 1200° C.

The preferred embodiment of this invention comprises adding to a titanium hydrolyzed product, preferably one produced according to the processes described in U. S. Reissue Patents 18,854 and 18,790, an antimony compound and at least one member selected from the group consisting of nickel sulfate and cobalt sulfate. The amount of nickel sulfate and/or cobalt sulfate which is employed is preferably between about 1 atom and about 10 atoms, calculated as cobalt or nickel per 100 atoms of titanium and between about 1 atom and about 3 atoms of antimony per each atom of cobalt and nickel. Thereafter the mixture is calcined at a temperature between about 900° C. and about 1050° C.

The calcination may be carried out in the presence of minor amounts of potassium or other alkali metal salts. Such a compound may be added along with the other reagents as a complex compound such as potassium antimonate or potassium antimony tartrate or, more simply, addition of a soluble salt such as potassium sulfate along with either the addition of cobalt or nickel sulfate. Such operations are usually carried out while the titanium oxide is in aqueous suspension and the composition, after the addition of all the ingredients, is dewatered and calcined.

This invention may be more readily understood by an examination of the following examples which are given for illustrative purposes and are not intended to place any restrictions or limitations on the herein described invention. In these examples various amounts of titanium oxide, antimony oxide, and nickel and cobalt compounds are disclosed and the effect of the variation in compositions can be noted. It is quite evident from the results that the product can be varied from light yellow to a dark buff by selection of proper amounts of the components used.

Example I

To a suspension containing 200 parts by weight of titanium oxide, 36 parts of antimony oxide and 35 parts of hydrated cobalt sulfate in solution were added. The cobalt sulfate solution diluted the suspension somewhat, so the concentration was maintained as high as possible so as to eliminate the necessity of removing large amounts of water during the drying and calcination operation. Upon calcination of this product an orange buff pigment was obtained after holding the furnace charge at 950° C. for about 10 minutes.

Example II

A slurry of hydrolyzed titanium oxide containing a small amount of adsorbed sulfuric acid was prepared and for each 200 parts by weight of titanium oxide contained in this suspension, 86 parts by weight of antimony sulfate and 35 parts by weight of hydrated cobalt sulfate were added. This slurry was subsequently dewatered and calcined at 950° C. The product likewise was an orange buff pigment similar in color to the product in Example I.

Example III

A thick aqueous suspension containing 200 parts by weight of titanium oxide, 33 parts by weight of hydrated nickel sulfate and 36 parts by weight of antimony oxide was prepared. After thorough stirring the material was dewatered, dried and calcined at 950° C. The calciner discharge was a bright yellow pigment.

Example IV

A solution containing 197 parts by weight of $NiSO_4.6H_2O$ was added to 1200 parts by weight of $TiO_2$ in the form of hydrolyzed filter cake containing adsorbed sulfuric acid and sufficient water was added to convert the cake to a fluid suspension. 219 parts of antimony oxide and 5.2 parts of potassium carbonate were subsequently added and the whole mass dried and calcined at 950° C. after thorough incorporation of the added materials. The calcined product was a bright yellow pigment of approximately the same color as the material of the preceding example.

Example V

The process of Example IV was repeated with the exception of the substitution of 210 parts by weight of $CoSO_4.7H_2O$ in place of the nickel sulfate. The calcined product was an orange buff pigment similar in color to the product of Example I.

Example VI

An aqueous suspension of hydrated $TiO_2$ was prepared by slurrying a filter cake in the minimum amount of water and to this slurry 7 parts by weight of hydrated cobalt sulfate and 7 parts by weight of antimony oxide were added. This product was subsequently dried and calcined at 950° C. to give a light buff pigment.

Example VII

A solution containing 21 parts by weight of hydrated cobalt sulfate was added to 200 parts by weight of titanium oxide and 21.8 parts by weight of antimony oxide. After thorough incorporation the suspension was dewatered and calcined at 950° C. The product was a buff pigment similar to Example I but somewhat lighter in tint.

Example VIII

A thick aqueous suspension comprising 200 parts by weight of titanium oxide was hydrated with 13.2 parts by weight of $NiSO_4.6H_2O$ and 14.6 parts by weight of $Sb_2O_3$ dewatered, and calcined at 950° C. The product was a bright yellow pigment having a color slightly lighter than that in Example III.

Example IX

A thick aqueous suspension was prepared containing 200 parts by weight of $TiO_2$, 14 parts by weight of cobalt sulfate, 13 parts by weight of nickel sulfate and 29 parts by weight of antimony oxide. Upon calcination at 950° C. the product was a clear yellow buff pigment.

Example X

The process of Example VIII was repeated adding 1.7 parts of potassium carbonate to the material prior to dewatering and calcination. The product was a yellow pigment almost identical in color and shade to that of Example VIII.

Example XI 14.2 parts by weight of $CoSO_4.7H_2O$ and 21.8 parts by weight of $Sb_2O_3$ were added to a slurry of hydrated titanium oxide containing 200 parts by weight of titanium oxide. The product when calcined gave a reddish buff pigment.

Example XII

The process of Example XI was repeated except that 17.85 parts of $CoCl_2.6H_2O$ was substituted for the cobalt sulfate. The product was the same color as when the cobalt sulfate was used as in the preceding example.

Example XIII

An aqueous suspension comprising 200 parts by weight $TiO_2$, 13.2 parts $NiSO_4.6H_2O$, 7 parts $CoSO_4.7H_2O$ and 21.8 parts $Sb_2O_3$ was prepared and after thorough incorporation of the ingredients it was dewatered, dried, and calcined at 950° C. The pigment was a yellow buff material somewhat yellower than the product of Example IX.

It is to be understood that the herein described specific embodiments of this invention may be subjected to modification and variation without departing from the scope thereof.

Thus, although I prefer to employ hydrolyzed titanium dioxide produced according to the processes described in U. S. Reissue Patents 18,854 and 18,790, it is to be understood that this invention is not limited thereto. Other materials may also be used either as uncalcined hydrolysis products, as for example those produced by the hydrolysis of titanium chloride or nitrate solutions as well as other hydrolyzate materials after calcination. It is important that the $TiO_2$ which is selected should be relatively free of coloring oxides other than those selected and disclosed above, for instance, iron oxide, chromium oxide, vanadium oxide, manganese oxide, as well as other compounds of these and other elements which modify the color of the resultant material and instead of getting the clean yellow or buff tints obtainable by my process, a dull, dirty pigment results. It is, therefore, desirable that the titanium oxide base material should be produced under conditions which would permit its use in the manufacture of relatively white titanium oxide pigment.

Although I prefer to employ an amount of nickel and/or cobalt within the range of between about 1 atom and about 10 atoms for each 100 atoms of titanium, it is to be understood that amounts less than or more than said specified amounts may be employed. Thus, I may employ as little as about 0.5 atom or as much as about 50 atoms. Further, while I prefer to employ an amount of antimony within the range of between about 1 and about 3 atoms of antimony for each atom of cobalt or nickel employed it is to be understood that I may use an amount outside of this range without departing from the scope of this invention. However, as a general rule the amount of antimony should not exceed about 4 atoms for each one atom of cobalt or nickel.

My preferred calcination temperature is between about 900° C. and about 1050° C. but a temperature outside of this range, for example, between about 800° C. and about 1200° C., may be employed. It is possible to use various types of calcination equipment, as for example, the externally heated muffle which was the type used in the examples given above. However, for production on a commercial scale I prefer to use the internally fired kiln type equipment because of the ease of operation. It is usually desirable to conduct the calcination under oxidizing conditions thereby avoiding the reduction of nickel and cobalt compounds to free metals.

As indicated above, the antimony can be suitably added as various compounds provided available antimony oxide is present during the calcination operation. Suitable compounds include the antimony oxides, alkali antimonites, and antimonates, antimony sulfate, antimony sulfide, and organic compounds of antimony. The antimony should be relatively free of color imparting materials and such a compound can be had in the open market as antimony oxide. Accordingly, I usually add antimony oxide to a water suspension of a titanium oxide material in the preparation of the material prior to calcination.

While I prefer to employ the soluble salts of nickel and cobalt such as crystalline cobalt sulfate and nickel sulfate this invention is not limited thereto since various other compounds of nickel and cobalt such as the chlorides, nitrates, oxides, hydroxides, and the like may be used. In case of the latter, upon addition to a water suspension of precipitated titanium oxide containing adsorbed sulfuric acid, the nickel and cobalt compounds are thoroughly distributed throughout the titanium oxide material and very satisfactory results are obtained.

In another modification of this process, I add solutions of cobalt and/or nickel along with a solution of an antimony salt to the titanium suspension and subsequently precipitate the added materials by addition of a soluble sulfide. In such an operation, the added materials assume an insoluble form and the aqueous suspension can be dewatered by filtration without the loss of the added materials. In the event that the compounds are not insoluble this loss can be minimized or eliminated by operating in very thick suspensions so that there is little or no filtrate during the dewatering operation. It is obvious that the latter may be carried out by simply drying the suspension without filtration.

The antimony compound can also be added in an earlier stage of the preparation of the improved pigment. It is quite satisfactory to dissolve antimony in the titanium solution to be hydrolyzed and, in that event, the antimony will appear in the hydrolyzed material as adsorbed antimony oxide. This mode of operation gives added assurance that the titanium oxide and the antimony compound will be intimately associated which is a necessary feature of this invention. The nickel or cobalt compounds are then added to the titanium oxide suspension and the pigment calcined as outlined above. Pigments of the highest quality are thereby obtained and this method of carrying out my invention is regarded as being highly desirable.

In addition to producing colored pigments from straight titanium dioxide, as has been described, my process is also applicable to pigments in which the titanium dioxide is extended with such materials as calcium sulfate and barium sulfate. For the production of colored extended titanium pigments the principles are entirely analogous to those in which straight titanium dioxide is used. The extender may be mixed with the titanium compound either by dry blending or be made up in water mixture with the titanium compound or may be added to a solution of a titanium compound from which the titanium is subsequently precipitated in intimate mixture with the extender. The addition of the cobalt, nickel, and antimony compounds may be made in the same manner as described for straight titanium compounds.

The colors obtained by co-calcination of a titanium oxygen compound with an antimony compound and at least one metal compound from the group consisting of nickel and cobalt, according to my invention, are entirely different from the colors obtained by calcination of the titanium compound with each of the metal compounds separately and then blending in the correct proportion to give the same percentage composition as the co-calcined pigments. For example, the attractive buff colored pigments produced by co-calcination of an uncalcined titanium oxygen compound with a cobalt compound and antimony oxide cannot be obtained by calcination of the titanium compound with a cobalt compound and calcination of the titanium compound with antimony oxide separately, followed by blending of the two calcined products to give the same percentage composition as the co-calcined pigment of titanium, cobalt, and antimony. In the blended product a blue-green pigment, not homogeneous in composition, is obtained.

As is quite evident from the above, the products of this invention are colored pigment particles composed of titanium dioxide intimately associated either physically or chemically with antimony compound and at least one compound of cobalt or nickel. These colored particles appear homogeneous and are easily distinguished from a mechanical mixture of titanium dioxide and coloring material. They also have superior durability to such mechanical mixtures. Further, they have cleaner tints and are useful in the preparation of more weather resistant paint films than has heretofore been possible. Typical exterior paints when prepared with my improved pigments present a more pleasing appearance for a greater length of time than do the prior art tinted titanium oxide pigments. This improvement is due in large measure to the absence of chromium compounds, especially chromate salts, which have a deleterious action when present in exposed paint films.

As many apparently widely different embodiments of this invention may be made without departing from the spirit and scope thereof, it is to be understood that I do not limit myself to the specific embodiments except as defined in the appended claims.

Having described the present invention the following is claimed as new and useful:

1. A process for the production of colored pigments having a tint within the range of light yellow to dark buff which pigments are substantially free from compounds of chromium which comprises calcining a mixture comprising white titanium oxide, a compound of antimony, and at least one member selected from the group consisting of compounds of nickel and cobalt.

2. A process for the production of colored pigments having a tint within the range of light yellow to dark buff which pigments are substantially free from compounds of chromium which comprises adding a compound of antimony to a white titanium oxide material, subsequently adding thereto at least one member selected from the group consisting of compounds of nickel and cobalt, and thereafter calcining at a temperature between about 800° C. and about 1200° C.

3. A process for the production of colored pigments having a tint within the range of light yellow to dark buff which pigments are substantially free from compounds of chromium which comprises adding a compound of antimony to a white titanium oxide material, subsequently adding thereto at least one member selected from the group consisting of soluble salts of nickel and cobalt, and thereafter calcining at a temperature between about 800° C. and about 1200° C.

4. A process for the production of colored pigments having a tint within the range of light yellow to dark buff which pigments are substantially free from compounds of chromium which comprises adding a compound of antimony to white titanium oxide, subsequently adding thereto between about 0.5 atom and about 50 atoms, per 100 atoms of titanium, of at least one member selected from the group consisting of soluble salts of nickel and cobalt, and thereafter calcining at a temperature between about 800° C. and about 1200° C.

5. A process for the production of colored pigments having a tint within the range of light yellow to dark buff which pigments are substantially free from compounds of chromium which comprises adding to white titanium oxide an antimony compound and at least one member selected from the group consisting of nickel sulfate and cobalt sulfate and thereafter calcining the mixture at a temperature between about 900° C. and about 1050° C.

6. A process for the production of colored pigments having a tint within the range of light yellow to dark buff which pigments are substantially free from compounds of chromium which comprises adding to white titanium oxide an antimony compound and at least one member selected from the group consisting of nickel sulfate and cobalt sulfate, the amount of sulfate agent employed being between about one atom and about 10 atoms per 100 atoms of antimony and between about 1 atom and about 3 atoms of antimony per atom of sulfate agent, and thereafter calcining at a temperature between about 900° C. and about 1050° C.

7. A process for the production of colored pigments having a tint within the range of light yellow to dark buff which pigments are substantially free from compounds of chromium which comprises preparing a white aqueous titanium oxide suspension having incorporated therein a compound of antimony and at least one member selected from the group consisting of compounds of nickel and cobalt, adding a soluble sulfide to said suspension thereby rendering insoluble any of said compounds present in soluble form and thereafter calcining.

8. A process for the production of colored pigments having a tint within the range of light yellow to dark buff which pigments are substantially free from compounds of chromium which comprises hydrolyzing a titanium salt solution in the presence of a soluble antimony compound and calcining the resulting white titanium oxide material containing adsorbed antimony oxide in the presence of at least one member selected from the group consisting of compounds of nickel and cobalt.

9. A process for the production of colored pigments having a tint within the range of light yellow to dark buff which pigments are substantially free from compounds of chromium which comprises calcining a mixture comprising white titanium oxide, a compound of antimony and at least one member selected from the group consisting of nickel sulfate and cobalt sulfate.

10. A process for the production of colored pigments having a tint within the range of light yellow to dark buff which pigments are substantially free from compounds of chromium which comprises adding to white titanium oxide a soluble antimony compound, subsequently adding thereto between about 0.5 atoms and about 50 atoms, per 100 atoms of titanium of at least one member selected from the group consisting of nickel sulfate and cobalt sulfate, and thereafter calcining at a temperature between about 800° C. and about 1200° C.

11. An improved colored titanium pigment having a tint within the range of light yellow to dark buff which pigment is substantially free from compounds of chromium which comprises a co-calcined mixture of white titanium oxide, a compound of antimony, and at least one member selected from the group consisting of compounds of nickel and cobalt.

12. An improved colored titanium pigment having a tint within the range of light yellow to dark buff which pigment is substantially free from compounds of chromium which comprises a so-calcined mixture of white titanium oxide, a compound of antimony, and a compound of nickel.

13. An improved colored titanium pigment having a tint within the range of light yellow to dark buff which pigment is substantially free from compounds of chromium which comprises a co-calcined mixture of white titanium oxide, a compound of antimony, and a compound of cobalt.

14. A process for the production of colored pigments having a tint within the range of light yellow to dark buff which pigments are substantially free from compounds of chromium which comprises calcining a mixture comprising a titanium dioxide barium sulfate pigment, a compound of antimony, and at least one member selected from the group consisting of compounds of nickel and cobalt.

15. A process for the production of colored pigments having a tint within the range of light yellow to dark buff which pigments are substantially free from compounds of chromium which comprises calcining a mixture comprising a titanium dioxide calcium sulfate pigment, a compound of antimony, and at least one member selected from the group consisting of compounds of nickel and cobalt.

16. An improved colored titanium pigment having a tint within the range of light yellow to dark buff which pigment is substantially free from compounds of chromium which comprises a co-calcined mixture of a titanium dioxide-barium sulfate pigment, a compound of antimony, and at least one member selected from the group consisting of compounds of nickel and cobalt.

17. An improved colored titanium pigment having a tint within the range of light yellow to dark buff which pigment is substantially free from compounds of chromium which comprises a co-calcined mixture of a titanium dioxide calcium sulfate pigment, a compound of antimony, and at least one member selected from the group consisting of compounds of nickel and cobalt.

HOLGER H. SCHAUMANN.